Nov. 27, 1923.
J. BERGSTROM
1,475,785
TRUCK AND ATTACHMENT THEREFOR
Original Filed April 25, 1919
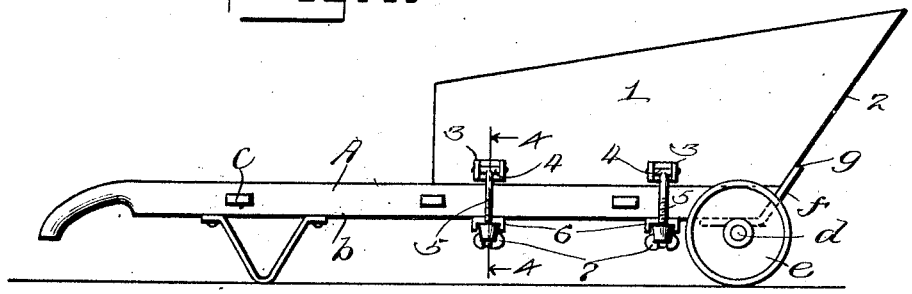
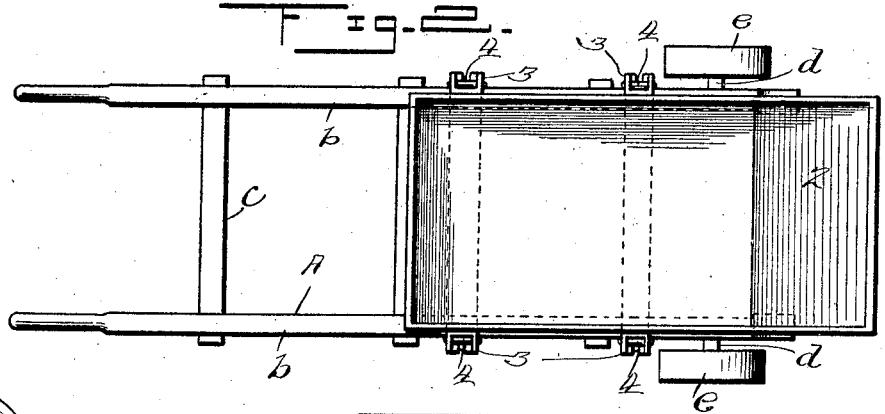
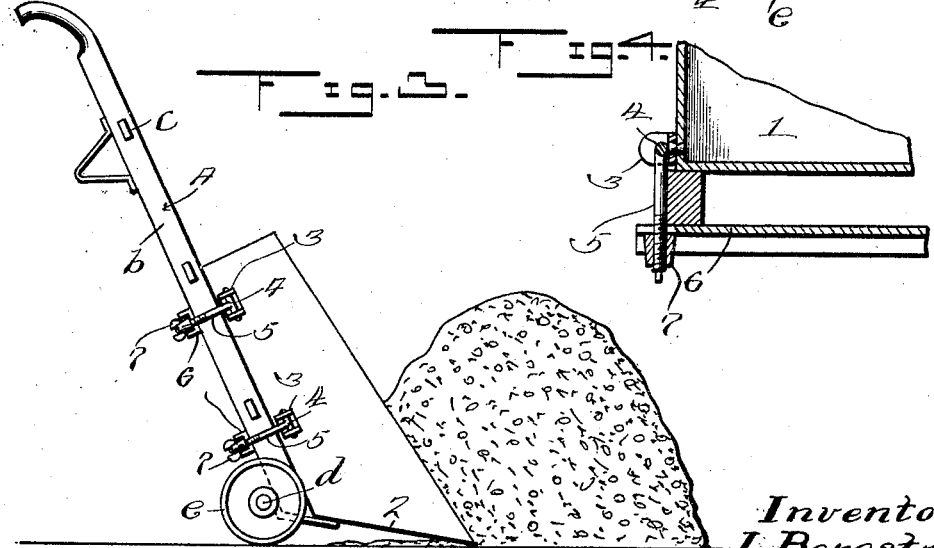
Inventor
J. Bergstrom
By (signature), Atty.

Patented Nov. 27, 1923.

1,475,785

UNITED STATES PATENT OFFICE.

JOHN BERGSTROM, OF DUPONT, WASHINGTON.

TRUCK AND ATTACHMENT THEREFOR.

Application filed April 25, 1919, Serial No. 292,575. Renewed March 20, 1923.

*To all whom it may concern:*

Be it known that I, JOHN BERGSTROM, a citizen of the United States, residing at Dupont, in the county of Pierce and State of Washington, have invented certain new and useful Improvements in Trucks and Attachments Therefor; and I do hereby declare the following to be a full, clear, and exact description of the invention, such as will enable others skilled in the art to which it appertains to make and use the same.

This invention relates to trucks and attachments therefor, and more particularly to a warehouse truck provided with an attachment specially adapted for unloading granular material from railway cars and similar vehicles.

One of the main objects of the invention is to provide a warehouse truck of standard construction and means associated therewith and detachably secured to the truck adapted to be forced into a pile of granular material by a movement of the truck so as to remove a batch or load of material therefrom. A further object is to provide a device which may be quickly and easily applied to a warehouse truck of standard construction for the purpose stated, and may be readily removed, when required, so as to permit the truck to be used in the ordinary manner. Another object is to provide a truck and an attachment therefor of simple construction and operation which may be produced at relatively small cost. Further objects will appear from the detailed description.

In the drawings:

Figure 1 is a side elevation of a truck with the attachment applied.

Figure 2 is a top plan view of the same.

Figure 3 is a side view of a truck and the attachment applied thereto as used for loading material from a stack or pile, the truck being shown in inclined or loading position.

Figure 4 is a detail sectional view on the plane of line 4—4 of Figure 1, looking in the direction indicated by the arrows.

The truck designated generally by A may be of any suitable or standard construction and comprises the side rails $b$ rigidly secured in parallel spaced relation by cross bars $c$ so as to form a substantially rectangular frame, a supporting axle $d$ being secured adjacent one end of this frame and provided at each end with a supporting wheel $e$. A substantially U-shaped member $f$ is secured to the ends of side rails $b$ adjacent shaft $d$, this member providing the usual inclined loading flange or lip $g$. This truck is of standard and well known construction and need not, therefore, be further described in detail.

In carrying my invention into effect, I provide a scoop member 1 which is of substantial rectangular shape, the outer or front wall 2 of this scoop member being inclined downwardly and inwardly and fitting snugly against member $f$ so as to be secured against movement longitudinally of the truck thereby. The scoop member 1 is provided, at each side thereof, with two pairs of spaced ears 3 which project outwardly from the side wall of the scoop member, these ears receiving between them the head 4 of a T-bolt 5 which, when in vertical position, fits snugly against the outer face of side bar $b$ of the truck A. The stem of the T-bolt fits into a slot provided in the end portion of a channel strip 6 which is secured to the under side of the truck frame and extends transversely thereof, the slot for the bolt being provided in the bight portion of the strip. A wing nut 7 is screwed upon the lower end portion of T-bolt 5 and is adapted to engage the bight portion of channel strip 6 at the under face thereof, as illustrated. As the T-bolts 5 fit snugly along the outer faces of side rails $b$ of the truck, all lateral movement of the scoop 1 upon the truck is eliminated and movement of the T-bolts out of the slots in the channel strip for receiving these bolts is prevented. The T-bolts and the parts associated therewith, together with the substantially U-shaped member $f$ forming the loading flange or lip $g$ cooperate to securely lock the scoop 1 to the forward portion of the truck so that, by tilting the truck, the forward inclined wall 2 of this scoop may be readily forced into a stack or pile of granular material so as to load the scoop, as illustrated in Figure 3. When this has been done, the scoop may be readily transported, by means of the truck, to the point at which it is desired to discharge the material. This device is adapted particularly for use around warehouses and similar places where warehouse trucks of ordinary type are in common use, and where it is frequently necessary to unload granular materials, such as coal, sand, gravel, etc., from railroad cars. By providing the scoop member 1 upon the truck, the device thus produced is highly efficient for the purpose stated and effectually eliminates all unnecessary handling of the material such as is necessary where the ordinary wheelbarrow is employed for unloading purposes. When it is not desired to unload granular material, the scoop 1 may be readily detached from the truck by loosening the wing nuts 7 upon bolts 5, after which the truck may be used in the ordinary manner.

What I claim is:

A hand truck having side bars, transverse strips disposed below the upper surfaces of said side bars and with their ends projecting laterally beyond the outer faces of the side bars, said ends being provided with open-end longitudinally disposed slots, a carrying body removably disposed on said side bars, fastening means on said body detachably cooperating with said slots, and said fastening means being movable and adapted to be disposed above the base of the carrying body when the latter is detached from the side bars so that the carrying body may have its base rest directly on a support.

In testimony whereof I affix my signature in presence of two witnesses.

JOHN BERGSTROM.

Witnesses:
 CHARLES L. PALMATARY,
 IVOR BERGSTROM.